(12) United States Patent
Schuller et al.

(10) Patent No.: US 6,217,300 B1
(45) Date of Patent: Apr. 17, 2001

(54) PISTON PUMP

(75) Inventors: Wolfgang Schuller, Sachsenheim; Ursula Eckstein, Schwieberdingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/487,320

(22) Filed: Jan. 19, 2000

(30) Foreign Application Priority Data

Jan. 20, 1999 (DE) ............................................. 199 02 018

(51) Int. Cl.⁷ ............................ F04B 39/10; F04B 53/12
(52) U.S. Cl. ............................. 417/549; 92/78; 417/454
(58) Field of Search ............................. 92/78; 303/116.4; 417/454, 549, 541

(56) References Cited

U.S. PATENT DOCUMENTS

| | | | |
|---|---|---|---|
| 5,395,219 | * 3/1995 | Hosoya et al. | 417/454 |
| 5,580,226 | * 12/1996 | Staib | 417/549 |
| 5,688,113 | * 11/1997 | Bareiss et al. | 417/549 |
| 5,823,639 | * 10/1998 | Zinnkann et al. | 303/116.4 |
| 6,042,350 | * 3/2000 | Beck | 417/549 |
| 6,082,244 | * 7/2000 | Siegel et al. | 92/78 |
| 6,093,003 | * 7/2000 | Hauser et al. | 417/541 |

* cited by examiner

*Primary Examiner*—Teresa Walberg
*Assistant Examiner*—Leonid Fastovsky
(74) *Attorney, Agent, or Firm*—Ronald E. Greigg; Edwin E. Greigg

(57) ABSTRACT

A piston pump with a piston that is displaceable in a bush. In order to keep the piston in the bush for retention therein a hollow-cylindrical filter, mounted on the bush, with yielding fingers that engage a groove of the piston keep the piston in the bush until the bush has been inserted into a pump housing.

7 Claims, 2 Drawing Sheets

PISTON PUMP

BACKGROUND OF THE INVENTION

The invention relates to a piston pump for a brake system of a vehicle.

The pump assembly of the invention is intended as a pump in a brake system of a vehicle and is used to control the pressure in wheel brake cylinders. Depending on the type of brake system, the abbreviations ABS (for anti-lock brake system), TCS (traction control system), ESP (electronic stability program) and EHB (electrohydraulic brake system) are used for such brake systems. In the brake system, the pump serves to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). In a brake system with wheel slip control (ABS or TCS) and/or a brake system serving as a steering aid (ESP) and/or an electrohydraulic brake system (EHB), the pump is needed. With the wheel slip control (ABS or TCS), locking of the wheels of the vehicle during a braking event involving a strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

Many such piston pumps are known. For instance, the piston pumps known from German Patent Disclosures DE 41 07 979 A1 and DE 44 07 978 A1 are set forth. The known piston pumps have a rod-like piston, which is axially displaceably guided in a bush. For driving the piston to execute a reciprocating stroke motion, an eccentric element is used that can be driven to rotate by an electric motor and that acts upon the piston on a face end protruding from the bush. The bush is inserted into a cylinder bore of a pump housing.

For assembling the known piston pumps, their pistons are introduced into the bush and are retained in the bush by the installation of a retention means. As the retention means, in the first reference cited, a rivet is inserted into a radial bore of the bush. The rivet protrudes on the inside, into an encompassing groove in the piston, which is wider by at least one piston stroke than a diameter of the rivet, and in this way secures the piston in the bush. In the second reference cited, a sleeve is press-fitted into one end of the bush. The piston of this piston pump tapers at an annular shoulder at which the sleeve press-fitted into the bush retains the piston in the bush. After that, the bush is screwed or press-fitted into the cylinder bore of the pump housing and caulked. Because the piston is secured in the bush for retention therein assembling the piston pump is made simpler, especially for piston pumps that have a piston restoring spring that presses the piston out of the bush.

OBJECT AND SUMMARY OF THE INVENTION

The piston pump of the invention has an advantage that the retention means automatically quasi-snaps onto the piston and engages the undercut automatically; as a result, while the piston is pressed farther into the bush, the piston cannot be pulled out from the bush any farther than where the piston is when the undercut meets the retention means. Compared with the known piston pumps, this makes it easier to introduce the piston into the bush in such a way that the piston is retained there. Because the retention means can be attached easily, a preassembled group that includes both the bush and the piston is obtained. The preassembled group is sturdy and easily manipulated; all of its parts are held together in a way secure for retention. The group can easily be inserted into a cylinder bore of the pump housing, for instance by press-fitting.

Another advantage of the piston pump of the invention is that it has a filter disposed in a space-saving way and at the same time the filter has the retention means. The assembly step of attaching the loss-prevention means to the bush is dispensed with and this step is accomplished by attaching the filter. The filter is a component of the preassembled group. By clamping attachment of the filter to the bush, the attachment can be done quickly and easily by slipping the filter onto the bush. For attaching the filter, the bush is not deformed by crimping, and thus there is no risk that metal chips or particles will form that could damage the piston in the bush in a piston pump operation. The clamping connection produces a firm seat of the filter on the bush with close tolerance in a way that can be reproduced in mass production and is always the same; an overly loose or overly firm seat of the filter is avoided.

Another advantage of the piston pump of the invention is that no stepped piston, as for instance in the piston pump known from DE 44 07 979 A1 mentioned above, is needed for the retention means; the piston can be guided at two axially spaced-apart points by the same guide diameter.

The undercut on the piston of the piston pump of the invention need not be embodied extending all the way around. For instance, it can also be formed by one or more recesses in the circumference of the piston, distributed over the circumference.

Advantageous features and refinements of the invention are defined hereinafter.

In a refinement, the filter serves as a guide for the piston in the bush and keeps the piston oriented axially to the bush before the preassembled group is inserted into the pump housing. This advantageously makes building in the parts that have to be built into the pump housing substantially easier.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
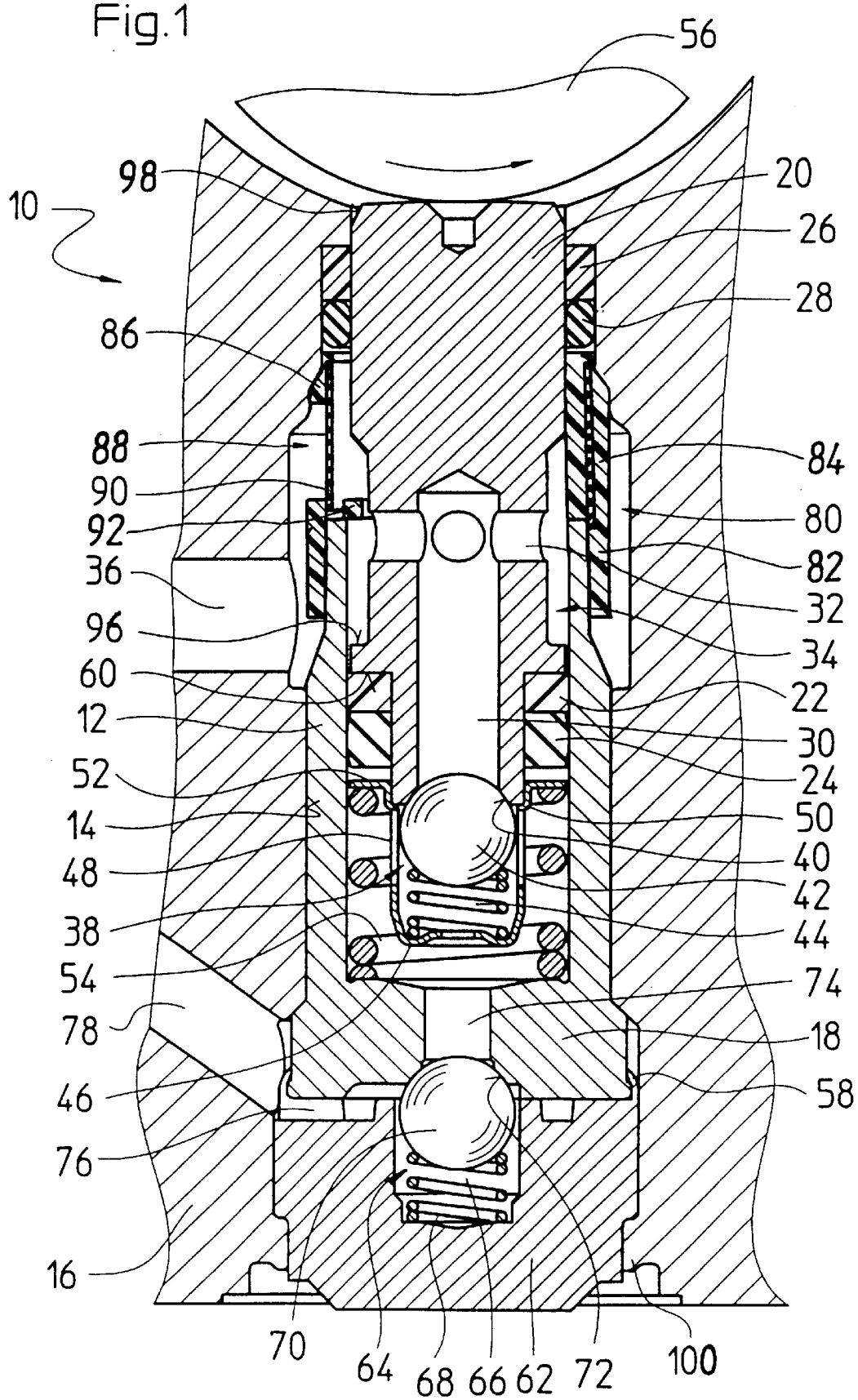
FIG. 1 is an angled axial section through a piston pump of the invention.

The piston pump of the invention, designated overall by reference numeral 10, shown in FIG. 1, has a bush 12, which is inserted into a stepped cylinder bore 14 of a hydraulic block that forms a pump housing 16. The hydraulic block, of which the drawing shows only a fragment surrounding the piston pump 10, is part of a slip-controlled hydraulic vehicle brake system, not otherwise shown. In the hydraulic block, besides the piston pump 10, other hydraulic components such as magnet valves and hydraulic reservoirs are inserted, and a master cylinder and wheel brake cylinders are connected to the hydraulic block. The hydraulic components are hydraulically connected to one another by means of the hydraulic block.

The bush 12 has a bush bottom 18 that is integral with the bush. A bolt-like piston 20 is received over approximately half its length in the bush 12. An end of the piston 20 located in the bush 12 is guided axially displaceably by a guide ring 22 along the inside surface of the bush 12 and is sealed off with a sealing ring 24. The other end of the piston 20, which protrudes out of the bush 12, is guided axially displaceably by means of a guide ring 26 directly in the cylinder bore 14 of the pump housing 16 and is sealed off on the pump housing 16 by a sealing ring 28.

For admitting fluid, the piston 20 is provided with an axial blind bore 30 beginning at its end located in the bush 12; near the bottom of the piston, this bore is intersected by transverse bores 32. A rated diameter of the piston 20 is equivalent to an inside diameter of the bush 12, and there is a clearance fit between the piston 20 and the bush 12; that is, relative to the bush 12, the piston 20 has an undersize that assures the axial displaceability of the piston 20. The blind bore 30 and transverse bores 32 communicate, through a wide groove 34 in the circumference of the piston 20 and an open face end of the bush 12, with an inlet bore 36 that discharges radially to the piston pump 10 into the cylinder bore 14.

As its inlet valve 38, the piston pump 10 of the invention has a spring-loaded check valve, which is mounted on the end of the piston 20 that is located inside the bush 12. An orifice of the blind bore 30 is embodied as a conical valve seat 40, against which a valve ball 42 is pressed, as a valve closing body, by a helical compression spring acting as a valve closing spring 44. The valve closing spring 44 is braced against a bottom of a cup-shaped valve cage 46, which is made of sheet metal as a deep-drawn part and has perforations 48. On the open end, the valve cage 46 has an encompassing annular step 50, with which the valve cage rests on the face end of the piston 20 located inside the bush 12, and a radial flange 52, at which it is pressed against the face end of the piston 20 by a piston restoring spring 54. The valve ball 42 and the valve closing spring 44 are received in the valve cage 46. The piston restoring spring 54 is made stronger than the valve closing spring 44. The piston restoring spring 54 is braced against the bush bottom 18.

For driving the piston 20 to an axially reciprocating stroke motion, the piston pump 10 of the invention has an eccentric element 56, which is driven to rotate by an electric motor and against whose circumference the piston 20 is pressed by the piston restoring spring 54.

The guide ring 22 and sealing ring 24 located in the bush 12 are fixed on the piston 20 in the axial direction between the radial flange 52 of the valve cage 46 and an annular step 60 of the piston 20.

A cylindrical closure element 62 is slipped onto the bush bottom 18 and is joined to the bush 12 with a crimp 58. The closure element 62 serves to close the cylinder bore 14 in a pressure-tight fashion and to fix the bush 12 in the pump housing 16. An outlet valve 64 in the form of a spring-loaded check valve is accommodated in the closure element 62. The closure element 62 has a coaxial blind bore 66, into which a helical compression spring as a valve closing spring 68 and a valve ball 70 as a valve closing body are inserted. The valve ball 70 cooperates with a conical valve seat 72, which is mounted at an orifice of a center bore 74 that passes axially through the bush bottom 18. The valve seat 72 is formed and compacted by swaging. Allowing fluid to flow out is accomplished through radial conduits 76 between the bush bottom 18 and the closure element 62 into a radial outlet bore 78 in the pump housing 16.

In an extension of the bush 12, a hollow-cylindrical filter 80 is mounted on an open end of the bush 12. For securing the filter 80 to the bush 12, the outer diameter of the bush is reduced in the region of its open end. The filter 80 has a hollow-cylindrical collar 82, with which it is slipped in the manner of a fit onto the open, reduced-diameter end of the bush 12. Viewed in the radial direction, the collar 82 of the filter 80 that surrounds the open end of the bush 12 is adapted to the bush 12 in such a way that after the filter 80 and bush 12 have been put together, a press fit takes place between the bush 12 and the collar 82, which brings about a clamping hold of the filter 80 on the bush 12 by nonpositive engagement.

Figure 2:
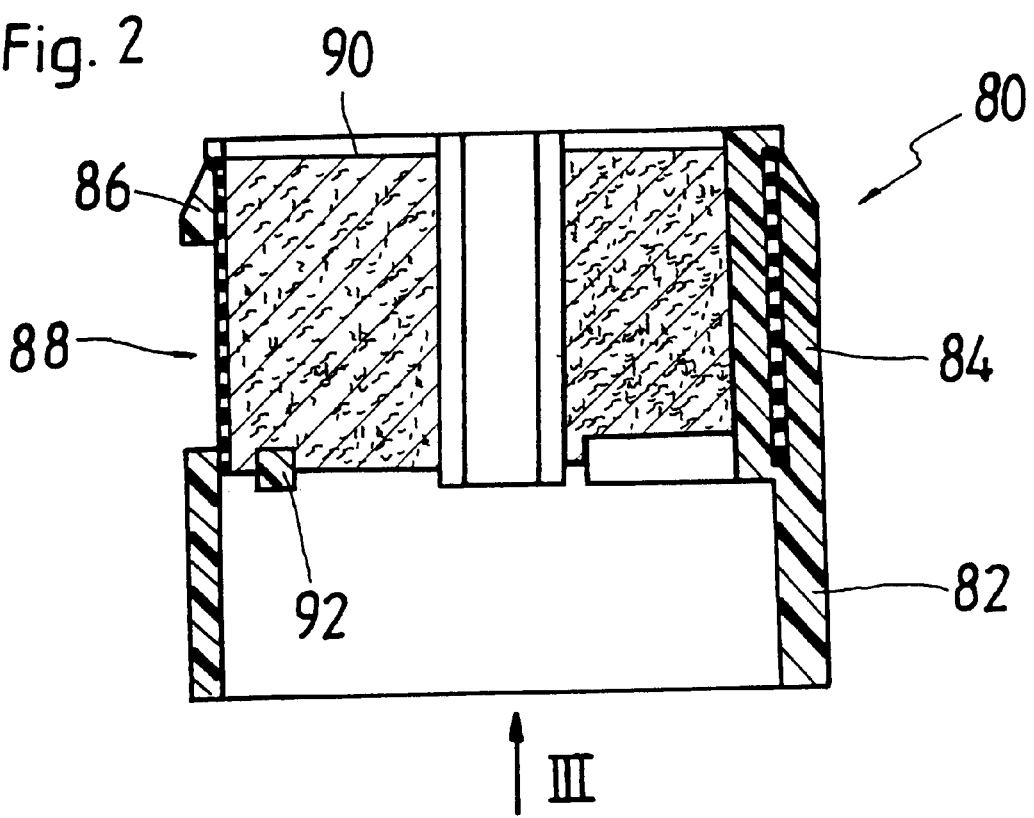
FIG. 2 shows a filter with a loss-prevention means for the piston pump of FIG. 1, on a larger scale, in an angled axial section taken along the line II—II of FIG. 3.
Figure 3:
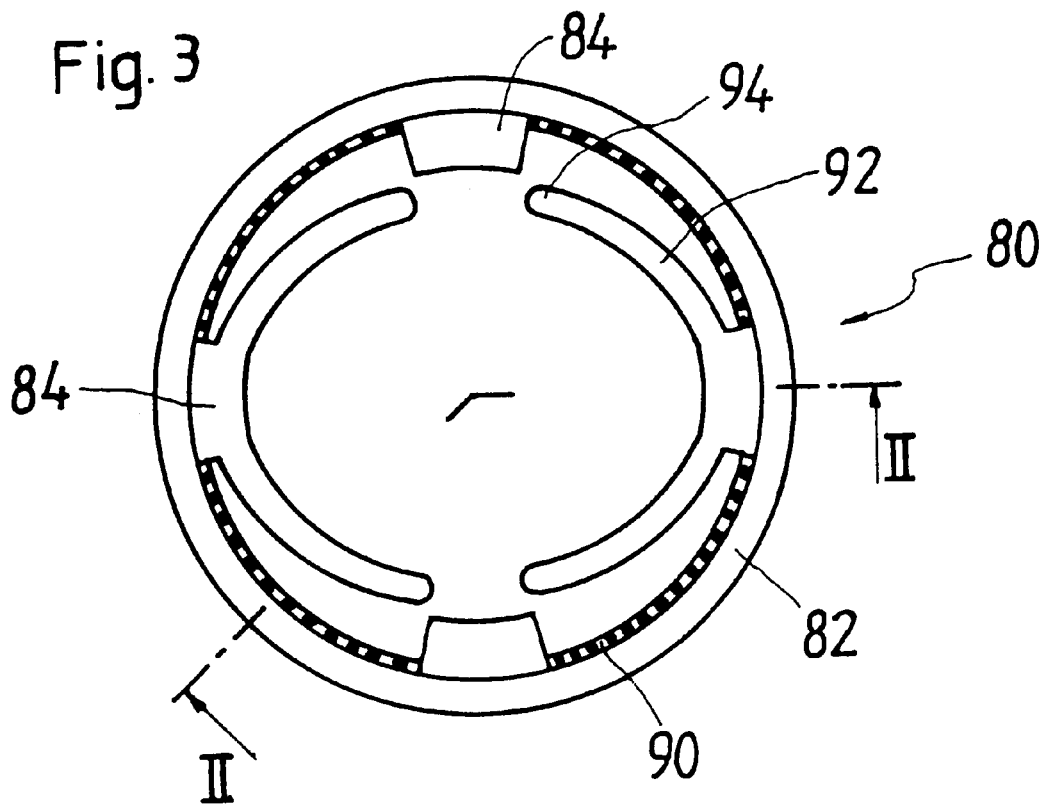
FIG. 3 is an end-on view of the filter of FIG. 2 in the direction of the arrow III in FIG. 2.

The filter 80 has a filter scaffold, which besides the collar 82 also includes filter struts 84 and a filter ring 86 (FIGS. 2 and 3). The filter struts 84 protrude axially parallel away from the collar 82 and carry the filter ring 86 on their ends remote from the filter collar 82.

The filter collar 82, filter struts 84 and filter ring 86 are made as an integral injection-molded plastic part. The filter struts 84, collar 82 and ring 86 act as frames for filter windows 88, into which a filter cloth 90 is inserted. The filter cloth 90 is tubular and is injection molded together with the filter scaffold 82, 84, 86.

The filter serves to filter the fluid flowing into the piston pump 10. The filter 80 also forms a guide, which orients the piston 20 coaxially in the bush 12 until the bush 12 is inserted into the cylinder bore 14 of the pump housing 16. For guiding the piston 20, the filter struts 84 are flush on their insides with an inside of the bush 12; the insides of the filter struts 84 have a curvature that corresponds to a diameter of the inside of the bush 12. As a result, at least until the insertion of the bush 12 into the cylinder bore 14 of the pump housing 16, the piston 20 rests on the insides of the filter struts 84 with its end protruding from the bush 12 and as a result is retained, axially aligned, in the bush 12. Once the bush 12 has been inserted into the pump housing 16, it is true that the piston 20 can also be guided in the pump housing 16 by the filter struts 84, but preferably the guide ring 26 inserted into the pump housing 16 performs this task. The filter struts 84 of the filter 80 that form the piston guide prevent the piston 20 from becoming canted in the bush 12, and they assure that the piston 20 upon insertion of the bush 12 into the cylinder bore 14 of the pump housing 16 will not strike against the sealing ring 28 inserted into the pump housing 16 but instead will pass into the sealing ring 28 and the guide ring 26. The filter collar 82 rests sealingly on the bush 12, and the filter ring 86 rests sealingly on the cylinder bore 14 of the pump housing 16, and thus no fluid aspirated by the piston pump 10 can reach the bush 12 without first being filtered. Fluid flowing into the piston pump 10 passes between the filter collar 82 and the filter ring 86 through the filter cloth 90 in the filter windows 88 into the groove 34 of the piston 20, and from there on into the transverse bores 32 and the blind bore 30.

The sectional view in FIG. 1 is angled along a longitudinal axis, not shown, of the piston pump 10 in such a way that in the right half of the drawing, the section passes through a filter strut 84, while in the left half of the drawing the sections passes through a filter window 88. The angling of the sectional view in FIG. 1 corresponds to the angling of the axial section shown in FIG. 2 through the filter 80, and the course of this section is represented by the line II—II in FIG. 3.

The filter 80 has a loss-prevention means for the piston 20 in the bush 12: Filter struts 84 facing one another have integral yielding fingers 92. The fingers 92 are disposed immediately adjoining the open end of the bush 12. The fingers 92 are curved in an arc and extend inward in an arc compared to a circumferential direction, so that free ends 94 of the fingers 92 protrude into the groove 34 of the piston 20.

A groove side 96 of the groove 34 in the piston 20 forms an undercut, which cooperates with the fingers 92 that form the retention means: Until the insertion of the bush 12 into the cylinder bore 14 of the pump housing 16, the piston restoring spring 54 presses the piston 20, with its groove side 96 forming the undercut, into contact with the fingers 92, which engage the groove side 96 from behind. In this way, the fingers 92 retain the piston 20 in the bush 12 counter to the force of the restoring spring 54, and the piston 20 cannot be pulled out from the bush 12.

For assembling the piston pump 10 of the invention, the filter 80 that has the retention means is slipped onto the piston 20, until the fingers 92 yield into the groove 34 of the piston 20. This means that the fingers 92 of the retention means engage the groove side 96 of the groove 34 of the piston 20 from behind. For mounting the filter 80, the piston 20 is provided, on its face end toward the eccentric element 56, with a chamfer, which spreads the fingers 92 apart when the filter 80 that has the retention means is slipped onto the piston 20.

Together with the guide ring 22 and sealing ring 24 that are slipped onto the piston 20, the inlet valve 38 that is mounted on the face end of the piston 20, and the piston restoring spring 54, the piston is introduced into the bush 12, and the filter 80 is slipped with its filter collar 82 onto the open end of the bush 12. The filter 80 holds by clamping action through nonpositive engagement on the bush 12 and with its fingers 92 secures the piston 20 in the bush 12 counter to the force of the piston restoring spring 54. It is also possible for the piston 20 to be introduced first into the bush 12 along with the inlet valve 38 and the piston restoring spring 54, and after that for the filter 80 to be slipped via the piston 20 onto the bush 12.

Once the closure element 62, with the outlet valve 64 inserted into the closure element 62, has been mounted on the bush bottom 18 by means of the crimp 58, the complete preassembled group, having the bush 12, the piston 20 inserted into it in a way secured for retention, and the closure element 62, is press-fitted into the cylinder bore 14 of the pump housing 16 and fixed in pressure-proof fashion in the pump housing 16 by a caulking 100 of the pump housing 16 on the closure element 62. The closure element 62 can be attached to the bush 12 either before or after the piston 20 is inserted into the bush 12.

The fingers 92 of the filter 80 form a first axial stop associated with the bush 12. The groove side 96 of the piston 20 oriented on the face end toward the filter 80 forms a second axial stop, associated with the piston 20. Before the preassembled group including the piston 20, bush 12 and filter 80 is inserted into the pump housing 16, the retention means functions in such a way that the piston 20 can be moved axially out of the bush 12 only as far as where it is when the stop 96 associated with the piston 20 comes to contact the stop 92 associated with the bush 12. Once the preassembled group has been installed in the pump housing 16, the outward or extension stroke of the piston 20 is limited by the eccentric element 56.

The foregoing relates to a preferred exemplary embodiment of the invention, it being understood that other variants and embodiments thereof are possible within the spirit and scope of the invention, the latter being defined by the appended claims.

We claim:

1. A piston pump, comprising a piston that is driven to execute a reciprocating stroke motion and is axially displaceably received, over at least part of its length, in a bush that is inserted into a pump housing, and a retention means for the piston is mounted on the bush, the retention means engages an undercut of the piston, and the undercut is made on the piston inside a piston circumference, the piston pump (10) has a tubular filter (80); the filter (80) is mounted, lengthening the bush (12), on an open face end of the bush (12); the retention means (92) is embodied to yield in the radial direction and automatically comes into engagement with the undercut (96) of the piston (20); the retention means (92) is mounted on the filter (80); and the filter (80) is mounted in clamping fashion on the bush (12).

2. The piston pump according to claim 1, in which the retention means (92) is integral with the filter (80).

3. The piston pump of claim 1, in which the filter (80) and the bush (12) are adjoined together in the manner of a tight fit, and that the filter (80) for the clamping fastening to the bush (12) has a press fit relative to the bush (12).

4. The piston pump of claim 1, in which the piston (20), over part of its length, protrudes axially out of the bush (12) and both inside the bush (12) and outside the bush (12), has a weighted diameter that corresponds to an inside diameter of the bush (12).

5. The piston pump of claim 1, in which the undercut (96) of the piston (20) is formed by a groove side (96) of a groove (34) made encompassing the circumference of the piston.

6. The piston pump of claim 1, in which the retention means (92) has a curved, yielding finger (92), extending inward relative to a circumferential direction, on an inside of the bush (12).

7. The piston pump of claim 1, in which the filter (80) forms a guide for the piston (20), which keeps the piston (20) oriented axially, or at least approximately axially, in the bush (12).

* * * * *